US012671019B2

(12) United States Patent
Matsumoto et al.

(10) Patent No.: US 12,671,019 B2
(45) Date of Patent: Jun. 30, 2026

(54) PARAMAGNETIC GARNET-TYPE TRANSPARENT CERAMIC, MAGNETO-OPTICAL DEVICE, AND PRODUCTION METHOD FOR PARAMAGNETIC GARNET-TYPE TRANSPARENT CERAMIC

(71) Applicant: Shin-Etsu Chemical Co., Ltd., Tokyo (JP)

(72) Inventors: Takuto Matsumoto, Annaka (JP); Masanori Ikari, Annaka (JP); Keita Tanaka, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 640 days.

(21) Appl. No.: 18/025,234

(22) PCT Filed: Aug. 26, 2021

(86) PCT No.: PCT/JP2021/031358
§ 371 (c)(1),
(2) Date: Mar. 8, 2023

(87) PCT Pub. No.: WO2022/054596
PCT Pub. Date: Mar. 17, 2022

(65) Prior Publication Data
US 2023/0317325 A1     Oct. 5, 2023

(30) Foreign Application Priority Data

Sep. 9, 2020     (JP) ................................ 2020-151245

(51) Int. Cl.
*H01F 1/00* (2006.01)
*C04B 35/44* (2006.01)
(Continued)

(52) U.S. Cl.
CPC ........... *H01F 1/0018* (2013.01); *C04B 35/44* (2013.01); *C04B 41/0072* (2013.01);
(Continued)

(58) Field of Classification Search
CPC .................. H01F 1/0018; C04B 35/44; C04B 2235/3224; C04B 2235/764; C04B 2235/78; G02F 1/0036
See application file for complete search history.

(56) References Cited

U.S. PATENT DOCUMENTS

| | | | |
|---|---|---|---|
| 5,013,696 A | 5/1991 | Greskovich et al. | |
| 10,494,307 B2 | 12/2019 | Yanagitani et al. | |

(Continued)

FOREIGN PATENT DOCUMENTS

| | | |
|---|---|---|
| CN | 104628375 A | 5/2015 |
| JP | 2638669 B2 | 8/1997 |

(Continued)

OTHER PUBLICATIONS

Furuse et al., "High Verdet constant of Ti-doped terbium aluminum garnet (TAG) ceramics", Optical Materials Express, 2016, vol. 6, No. 1, pp. 191-196, cited in Specification. (6 pages).
(Continued)

*Primary Examiner* — Cameron K Miller
(74) *Attorney, Agent, or Firm* — WHDA, LLP

(57) ABSTRACT

A paramagnetic garnet-type transparent ceramic that exhibits a high laser damage threshold, said ceramic being a sintered body of a Tb-containing rare earth-aluminum garnet represented by formula (1), and being characterized in that the average sintered grain size is 10-40 μm, and the insertion loss at a wavelength of 1,064 nm in the optically effective region along the length direction of a 20 mm-long sample is 0.05 dB or less.
(Continued)

$$(Tb_{1-x-y}Y_xSc_y)_3(Al_{1-z}Sc_z)_5O_{12} \qquad (1)$$

(In the formula, $0 \leq x < 0.45$, $0 \leq y < 0.08$, $0 \leq z < 0.2$, and $0.001 < y + z < 0.20$.)

5 Claims, 1 Drawing Sheet

(51) Int. Cl.

| | | |
|---|---|---|
| *C04B 41/00* | (2006.01) | |
| *G02F 1/00* | (2006.01) | |
| *G02F 1/09* | (2006.01) | |

(52) U.S. Cl.

CPC .............. *G02F 1/0036* (2013.01); *G02F 1/09* (2013.01); *C04B 2235/3222* (2013.01); *C04B 2235/3224* (2013.01); *C04B 2235/764* (2013.01); *C04B 2235/78* (2013.01); *C04B 2235/9653* (2013.01)

(56) References Cited

U.S. PATENT DOCUMENTS

| | | | |
|---|---|---|---|
| 11,472,745 B2 | 10/2022 | Ikari | |
| 2005/0157219 A1 | 7/2005 | Sekijima et al. | |
| 2013/0038927 A1* | 2/2013 | Hatanaka ................ | G02F 1/093 252/583 |
| 2018/0194685 A1* | 7/2018 | Yanagitani .............. | C04B 35/44 |
| 2019/0353939 A1 | 11/2019 | Ikari | |
| 2019/0359496 A1 | 11/2019 | Tanaka et al. | |
| 2019/0366584 A1 | 12/2019 | Matsumoto et al. | |
| 2022/0146866 A1 | 5/2022 | Yahagi et al. | |

FOREIGN PATENT DOCUMENTS

| | | |
|---|---|---|
| JP | 2002-293693 A | 10/2002 |
| JP | 4107292 B2 | 6/2008 |
| JP | 2011-213552 A | 10/2011 |
| JP | 2019-199386 A | 11/2019 |
| JP | 2019-202916 A | 11/2019 |
| JP | 2019-207340 A | 12/2019 |
| JP | 2020-067523 A | 4/2020 |
| WO | 2011/132668 A1 | 10/2011 |
| WO | 2017/033618 A1 | 3/2017 |
| WO | 2018/193848 A1 | 10/2018 |

OTHER PUBLICATIONS

Duan et al., "Fabrication and properties of (TbxY1-x)3Al5O12 transparent ceramics by hot isostatic pressing", Optical Materials, 2017, vol. 72, pp. 58-62, Elsevier, cited in Specification. (5 pages).

Aung et al., "Development of optical grade (TbxY1-x)3Al5O12 ceramics as Faraday rotator material", Journal of the American Ceramic Society, 2017, vol. 100, pp. 4081-4087, cited in Specification. (7 pages).

Wan et al., "Effect of (Tb+Y)/Al ratio on Microstructure Evolution and Densification Process of (Tb0.6Y0.4)3Al5O12 Transparent Ceramics", Materials, 2019, vol. 12, 300, cited in Specification. (8 pages).

Ikesue et al., "Microstructure and Optical Properties of Hot Isostatically Pressed Nd:YAG Ceramics", Journal of the American Ceramic Society, 1996, vol. 79, pp. 1927-1933, cited in Specification. (7 pages).

Yoshida et al., "Optical properties and Faraday effect of ceramic terbium gallium garnet for a room temperature Faraday rotator", Optics Express, 2011, vol. 19, No. 16, pp. 15181-15187, cited in Specification. (7 pages).

Kamimura et al., "Investigation of bulk laser damage in transparent YAG ceramics controlled with microstructural refinement", Proc. of SPIE, 2008, vol. 7132, pp. 713215-1 to 713215-5, cited in Specification. (6 pages).

Wurst et al., "Lineal Intercept Technique for Measuring Grain Size in Two-Phase Polycrystalline Ceramics", Journal of the American Ceramic Society, 1972, 55, 109, cited in Specification. (1 page).

Carr et al., "Wavelength Dependence of Laser-Induced Damage: Determining the Damage Initiation Mechanisms", Physical Review Letters, 2003, vol. 91, pp. 127402-1 to 127402-4, cited in Specification. (4 pages).

International Search Report dated Nov. 2, 2021, issued in counterpart Application No. PCT/JP2021/031358. (2 pages).

* cited by examiner

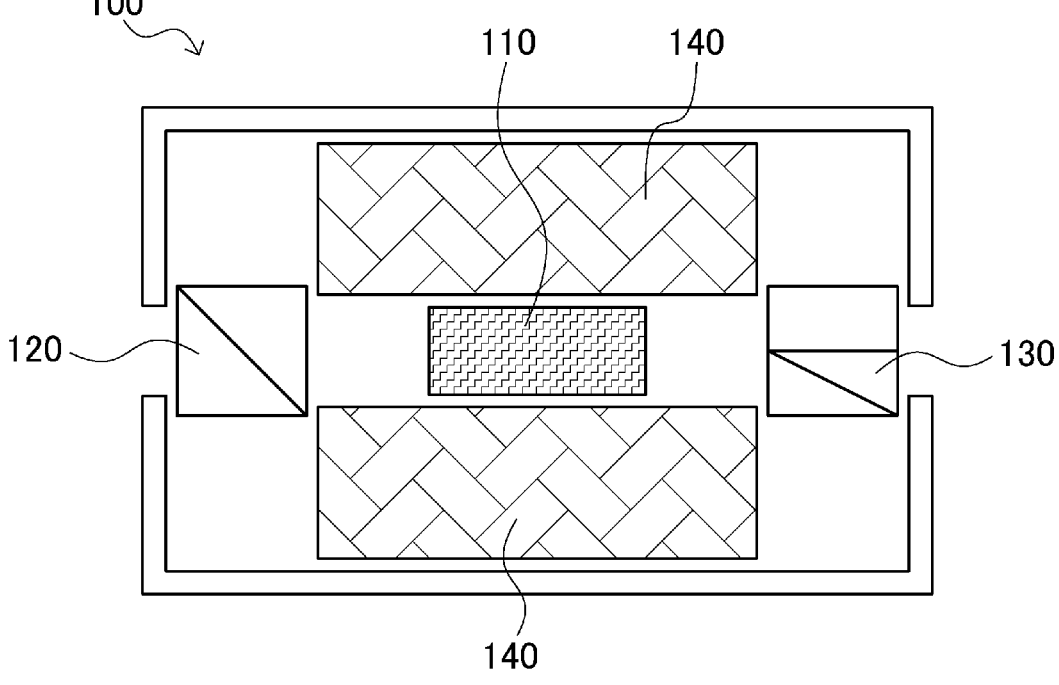

PARAMAGNETIC GARNET-TYPE TRANSPARENT CERAMIC, MAGNETO-OPTICAL DEVICE, AND PRODUCTION METHOD FOR PARAMAGNETIC GARNET-TYPE TRANSPARENT CERAMIC

TECHNICAL FIELD

This invention relates to a paramagnetic garnet type transparent ceramic material having light transmission in the visible and/or near-infrared region, and more particularly, to a terbium-containing paramagnetic garnet type transparent ceramic material which is suitable for constructing magneto-optical devices such as optical isolators, a magneto-optical device comprising the paramagnetic garnet type transparent ceramic material, and a method of preparing the paramagnetic garnet type transparent ceramic material.

Industrial laser machines are provided with an optical isolator for the purpose of preventing light, typically reflected light from backward return. In the interior of the isolator, terbium-doped glass or terbium gallium garnet (TGG) is loaded as a Faraday rotator (see, for example, Patent Document 1: JP-A 2011-213552). The magnitude of Faraday effect is quantitated by a Verdet constant. The TGG crystal has a Verdet constant of 40 rad/(T·m)=0.13 min/(Oe·cm), and the terbium-doped glass has a Verdet constant of 0.098 min/(Oe·cm). Since the TGG crystal has a relatively high Verdet constant, it is widely used as the standard Faraday rotator. Also known is terbium aluminum garnet (TAG) crystal. The TAG crystal allows the length of Faraday rotator to be reduced because its Verdet constant is about 1.3 times that of TGG crystal. The TAG crystal can be used in fiber lasers and is regarded satisfactory (see, for example, Patent Document 2: JP-A 2002-293693 and Patent Document 3: JP 4107292).

Recently, a method of forming TAG as transparent ceramics is disclosed, for example, in Patent Document 4: WO 2017/033618, Patent Document 5: WO 2018/193848, and Non-Patent Document 1: "High Verdet constant of Ti-doped terbium aluminum garnet (TAG) ceramics". Also, a method of preparing a transparent ceramic YTAG of the formula: $(Tb_xY_{1-x})_3Al_5O_{12}$ wherein yttrium substitutes for part of terbium, that is, $0.2 \le x \le 0.8$ or $0.5 \le x \le 1.0$ or $x=0.6$ is reported, for example, in Non-Patent Document 2: "Fabrication and properties of $(Tb_xY_{1-x})_3Al_5O_{12}$ transparent ceramics by hot isostatic pressing", Non-Patent Document 3: "Development of optical grade $(Tb_xY_{1-x})_3Al_5O_{12}$ ceramics as Faraday rotator material", and Non-Patent Document 4: "Effect of (Tb+ Y)/Al ratio on Microstructure Evolution and Densification Process of $(Tb_{0.6}Y_{0.4})_3Al_5O_{12}$ Transparent Ceramics". Since Tb-containing rare earth aluminum garnet exhibits a high thermal conductivity as compared with TGG, it is expected to form a Faraday component having a small thermal lens effect. Further, an optical isolator loaded with TAG transparent ceramics substituted with trivalent ions is disclosed, for example, in Patent Document 6: JP-A 2020-067523, which shows an optical isolator having a small thermal lens effect as compared with optical isolators loaded with TGG.

As discussed above, most of the latest reports on Tb-containing rare earth aluminum garnet are based on ceramics. The reason is that since TAG has an incongruent composition, single crystals thereof are difficult to prepare. However, ceramics generally contain many scattering sources such as bubbles, heterophase, foreign matter and microcracks in their system. In order to obtain highly transparent ceramics intended for use as Faraday rotators, it is necessary to utterly exclude scattering sources such as bubbles and foreign matter.

One of the means for reducing bubbles and microcracks in the bulk of ceramics is hot isostatic pressing (HIP) treatment. In the HIP treatment, a sintered body (pre-sintered body) which is previously densified to a relative density of at least 94% is subjected to high temperature/high pressure treatment to induce plastic flow in the ceramic to compress and remove defects. During the HIP treatment, many bubbles are excluded out of the system and thus removed, but some bubbles often remain compressed within the system. For this reason, when the HIPed body is exposed to subatmospheric pressure at high temperature, a phenomenon that the once compressed or hidden bubbles expand again to increase the scattering intensity is observed.

For further reducing bubbles and heterophases in the bulk of ceramics which have not been excluded by the HIP treatment, there is a method of effecting re-sintering step after HIP treatment to induce grain growth for thereby excluding the bubbles and heterophase out of the system. Ikematsu et al. report a method of pre-sintering a YAG ceramic in vacuum at 1,600° C. for 3 hours, effecting HIP treatment at 1,500-1,700° C. for 3 hours to form a transparent ceramic, and re-sintering the ceramic at 1,750° C., which is higher than the HIP treatment temperature, for 20 hours. See Non-Patent Document 5: "Microstructure and Optical Properties of Hot Isostatic Pressed Nd:YAG Ceramics". Also, Patent Document 7: JP 2638669 discloses a method of preparing a ceramic body comprising the steps of forming a green compact having a suitable shape and composition, effecting pre-sintering step at a temperature in the range of 1,350 to 1,650° C., effecting HIP treatment step at a temperature of 1,350 to 1,700° C., and effecting re-sintering step at a temperature beyond 1,650° C. for thereby removing pores.

Meanwhile, the current pulse laser machines are tailored toward a higher power and shorter pulse for achieving finer processing. Since the peak intensity increases as the pulse duration becomes shorter, there frequently arises a problem that the Faraday rotator is damaged by the transmission of a short pulse laser beam. For example, Non-Patent Document 6: "Optical properties and Faraday effect of ceramic terbium gallium garnet for a room temperature Faraday rotator" describes information relating to laser-induced damage thresholds of TGG single crystal and TGG transparent ceramics by pulse laser beam of wavelength 1,064 nm. If the Faraday rotator is damaged, then transmittance, isolation and beam quality are deteriorated and at the worst, the optical isolator breaks down. It is generally believed that the causes to optical damages by pulse laser include ionization by multi-photon absorption, electron avalanche breakdown, absorption by impurities, and the like. It is pointed out, for example, in Non-Patent Document 7: "Investigation of bulk laser damage in transparent YAG ceramics controlled with microstructural refinement" that particularly in the case of transparent ceramics, the laser-induced damage threshold is reduced by the presence of scattering sources such as grain boundaries and bubbles. Thus, for providing a ceramic Faraday rotator having a high laser-induced damage threshold, it is important to manage the absorption and scattering of a material so as to draw out its potential to the maximum extent.

PRIOR ART DOCUMENTS

Patent Documents

Patent Document 1: JP-A 2011-213552
Patent Document 2: JP-A 2002-293693

Patent Document 3: JP 4107292
Patent Document 4: WO 2017/033618
Patent Document 5: WO 2018/193848
Patent Document 6: JP-A 2020-067523
Patent Document 7: JP 2638669

Non-Patent Documents

Non-Patent Document 1: "High Verdet constant of Ti-doped terbium aluminum garnet (TAG) ceramics", Optical Materials Express, Vol. 6, No. 1, 191-196 (2016)
Non-Patent Document 2: "Fabrication and properties of $(Tb_xY_{1-x})_3Al_5O_{12}$ transparent ceramics by hot isostatic pressing", Optical Materials, 72, 58-62 (2017)
Non-Patent Document 3: "Development of optical grade $(Tb_xY_{1-x})_3Al_5O_{12}$ ceramics as Faraday rotator material", Journal of the American Ceramic Society, 100, 4081-4087 (2017)
Non-Patent Document 4: "Effect of (Tb+Y)/Al ratio on Microstructure Evolution and Densification Process of $(Tb_{0.6}Y_{0.4})_3Al_5O_{12}$ Transparent Ceramics", Materials, 12, 300 (2019)
Non-Patent Document 5: "Microstructure and Optical Properties of Hot Isostatically Pressed Nd:YAG Ceramics", Journal of the American Ceramic Society, 79, 1927-1933 (1996)
Non-Patent Document 6: "Optical properties and Faraday effect of ceramic terbium gallium garnet for a room temperature Faraday rotator", Optics Express, Vol. 19, No. 16, 15181-15187 (2011)
Non-Patent Document 7: "Investigation of bulk laser damage in transparent YAG ceramics controlled with microstructural refinement", Proc. of SPIE, Vol. 7132, 713215 (2008)
Non-Patent Document 8: "Lineal Intercept Technique for Measuring Grain Size in Two-Phase Polycrystalline Ceramics", Journal of the American Ceramic Society, 55, 109 (1972)
Non-Patent Document 9: "Wavelength Dependence of Laser-Induced Damage: Determining the Damage Initiation Mechanisms", Physical Review Letters, 91, 127402 (2003)

SUMMARY OF INVENTION

Technical Problem

In conjunction with the advance of pulse laser machines toward finer processing as discussed above, a Faraday rotator having a high laser-induced damage threshold is needed. Under the aforementioned circumstances, recently Non-Patent Document 3 reports that a dense ceramic sintered body having the composition $(Tb_xY_{1-x})_3Al_5O_{12}$ wherein x=0.5 to 1.0 has a high extinction ratio (existing 35 dB being improved to 39.5 dB or higher) and a reduced insertion loss (existing 0.05 dB being improved to 0.01-0.05 dB) as compared with the existing TGG crystal. The material described in Non-Patent Document 3 is a ceramic material which eliminates the precipitation of perovskite heterophase, from which the TGG crystal suffers, and enables to further reduce the insertion loss by substituting Y ions for part of Tb ions, and from which a garnet type Faraday rotator of extremely high quality is constructed. On carrying out experiments with reference to this document, however, the inventors found that an acute drop of the transmittance of laser light occurs during operation of an optical isolator loaded with an experimental Faraday rotator, giving rise to the problem that the optical isolator ceases to function. An improvement in the stability of an optical isolator loaded with Tb-containing rare earth aluminum garnet ceramics is left outstanding. An analysis of failed optical isolators revealed that the Faraday rotator therein is broken by laser-induced damage, and as a result, the transmittance of the optical isolator is reduced.

An object of the invention, which has been made under the above-mentioned circumstances, is to provide a paramagnetic garnet type transparent ceramic material of TAG, TYAG or TYSAG system having a high laser-induced damage threshold; a magneto-optical device comprising the paramagnetic garnet type transparent ceramic material; and a method for preparing the paramagnetic garnet type transparent ceramic material.

Solution to Problem

Making a study on the outstanding problem, the inventors have found that it is effective for improving the laser-induced damage threshold of a Faraday rotator that (i) bubbles, grain boundaries, heterophase, and foreign matter in a ceramic material used as a Faraday rotator are reduced below a certain amount by increasing the sintered grain size above a certain level and (ii) the absorption of oxygen defects (e.g., F or F+center) is reduced by oxidative annealing treatment. In particular, an optical isolator loaded with a Faraday rotator having a laser-induced damage threshold of $20$ J/cm$^2$ or higher functions in a stable manner without experiencing any drop of transmittance even when a picosecond pulse laser beam is transmitted thereby. The invention is predicated on this finding.

Accordingly, the invention provides a paramagnetic garnet type transparent ceramic material, a magneto-optical device, and a method for preparing the paramagnetic garnet type transparent ceramic material, as defined below.
1.

A paramagnetic garnet type transparent ceramic material which is a sintered body of Tb-containing rare earth aluminum garnet having the formula (1):

$$(Tb_{1-x-y}Y_xSc_y)_3(Al_{1-z}Sc_z)_5O_{12} \qquad (1)$$

wherein $0 \le x < 0.45$, $0 \le y < 0.08$, $0 \le z < 0.2$, and $0.001 < y + z < 0.20$, wherein the paramagnetic garnet type transparent ceramic material has an average sintered grain size of from 10 μm to 40 μm, and in the form of a sample of 20 mm long has an insertion loss of up to 0.05 dB at wavelength 1,064 nm in an optical effective region in its longitudinal direction.
2.

The paramagnetic garnet type transparent ceramic material of 1, having a laser-induced damage threshold of at least $20$ J/cm$^2$ at wavelength 1,064 nm and pulse duration 5 ns.
3.

A magneto-optical device constructed using the paramagnetic garnet type transparent ceramic material of 1 or 2.
4.

The magneto-optical device of 3 which is an optical isolator comprising a Faraday rotator composed of the paramagnetic garnet type transparent ceramic material and polarizers disposed forward and backward of the Faraday rotator on its optical axis, the optical isolator being utilized in a wavelength band of from 0.9 μm to 1.1 μm.

5.

A method of preparing the paramagnetic garnet type transparent ceramic material of 1 or 2, comprising the steps of:

pressure-sintering a sintered body of a Tb-containing rare earth aluminum garnet having the formula (1):

$$(Tb_{1-x-y}Y_xSc_y)_3(Al_{1-z}Sc_z)_5O_{12} \qquad (1)$$

wherein $0 \le x < 0.45$, $0 \le y < 0.08$, $0 \le z < 0.2$, and $0.001 < y + z < 0.20$, heating the pressure-sintered body at a temperature higher than the pressure-sintering temperature for re-sintering to form a re-sintered body having an average sintered grain size of at least 10 µm, and
oxidatively annealing the re-sintered body in an oxidative atmosphere at a temperature of at least 1,400° C.

Advantageous Effects of Invention

According to the invention, there is provided a paramagnetic garnet type transparent ceramic material having a high laser-induced damage threshold of at least 20 J/cm², especially a transparent ceramic material best suited for a Faraday rotator to construct a magneto-optical device, typically optical isolator.

BRIEF DESCRIPTION OF DRAWINGS

FIG. 1 is a schematic cross-sectional view of an optical isolator constructed using the inventive paramagnetic garnet type transparent ceramic material as the Faraday rotator.

DESCRIPTION OF EMBODIMENTS

[Paramagnetic Garnet Type Transparent Ceramic]

The paramagnetic garnet type transparent ceramic material of the invention is described below.

The invention provides a paramagnetic garnet type transparent ceramic material which is a sintered body of Tb-containing rare earth aluminum garnet having the formula (1):

$$(Tb_{1-x-y}Y_xSc_y)_3(Al_{1-z}Sc_z)_5O_{12} \qquad (1)$$

wherein $0 \le x < 0.45$, $0 \le y < 0.08$, $0 \le z < 0.2$, and $0.001 < y + z < 0.20$, The paramagnetic garnet type transparent ceramic material has an average sintered grain size of from 10 µm to 40 µm, and in the form of a sample of 20 mm long has an insertion loss of up to 0.05 dB at wavelength 1,064 nm in an optical effective region in its longitudinal direction.

In the garnet crystal structure represented by formula (1), the site mainly occupied by Tb, that is, the former parentheses in formula (1) is designated A site, and the site mainly occupied by Al, that is, the latter parentheses in formula (1) is designated B site.

At A site in formula (1), terbium (Tb) is an element which has the largest Verdet constant among trivalent rare earth ions, exhibits extremely low absorption in the 1,070 nm region (wavelength band of from 0.9 µm to 1.1 µm) used in fiber lasers, and is best suited for use as the optical isolator material in this wavelength region. It is noted that Tb(III) ions are readily oxidized into Tb(IV) ions. It is desirable to exclude Tb(IV) ions as much as possible for the reason that if Tb(IV) ions are generated in metal oxide, then the ions absorb light at wavelengths in a broad range from ultraviolet to near-infrared to reduce the transmittance. One strategy for avoiding the generation of Tb(IV) ions is to adopt the crystal structure where Tb(IV) ions are unstable, that is, garnet structure.

Yttrium (Y) has an ionic radius which is about 2% smaller than that of terbium. When it combines with aluminum to form a composite oxide, it forms the garnet phase more stably than the perovskite phase. Yttrium is thus an element preferably utilized herein.

At B site in formula (1), aluminum (Al) is an element which has the smallest ionic radius among trivalent ions that can exist stable in oxides having the garnet structure and which can minimize the lattice constant of Tb-containing paramagnetic garnet oxides. It is preferable that the lattice constant of garnet structure can be reduced without changing the Tb content, because the Verdet constant per unit length can be increased.

Furthermore, aluminum is a light metal, is weakly diamagnetic as compared with gallium, and is expected to exert an effect of relatively enhancing the magnetic flux density created within the interior of the Faraday rotator, which is also preferable because the Verdet constant per unit length can be increased. In fact, the Verdet constant of TAG ceramics is increased to 1.25 to 1.5 times that of TGG. It becomes possible that the Verdet constant per unit length is maintained equal to or slightly below that of TGG, even when the relative concentration of terbium is reduced by substituting yttrium ions for some of terbium ions. Therefore, aluminum is the suitable constituent element in the invention.

In case composite oxides consist of constituent elements Tb, Y and Al, they sometimes do not assume the garnet structure due to minute weighing errors. It is then difficult to produce transparent ceramics useful in the optical application in a consistent manner. The invention aims to eliminate any compositional shifts due to minute weighing errors by adding scandium (Sc) as an additional constituent element. Scandium is an element having an intermediate ionic radius which can form a solid solution on both A and B sites in oxides of the garnet structure. Scandium serves to adjust a distribution ratio between A site (rare earth site consisting of Tb and Y) and B site (aluminum site) so as to coincide with the stoichiometric ratio when a blend ratio of rare earth elements Tb and Y to Al shifts from the stoichiometry due to variations during weighing, and thereby so as to minimize the crystallite creation energy. In this sense, scandium is a buffer material that forms a solid solution on both A site and B site. Also, scandium is an element which can limit the proportion of alumina heterophase to the garnet matrix to 1 ppm or less and the proportion of perovskite heterophase to the garnet matrix to 1 ppm or less. This element is added in order to improve the yield of products.

In formula (1), x is a number in the range: $0 \le x < 0.45$, preferably $0.05 \le x < 0.45$, more preferably $0.10 \le x \le 0.40$, even more preferably $0.20 \le x \le 0.40$. Ceramics wherein x is in the range have a Verdet constant of at least 30 rad/(T·m) at normal temperature (23±15° C.) and wavelength 1,064 nm, and so the ceramics can be used as the Faraday rotator. A larger value of x in the range is preferred because of the tendency that the thermal lens effect becomes weaker. Also a larger value of x in the range is preferred because of the tendency that the diffuse transmittance becomes smaller. In contrast, a value of x which is equal to or greater than 0.45 is undesirable because the Verdet constant at wavelength 1,064 nm is less than 30 rad/(T·m). Differently stated, if the relative concentration of Tb is excessively thinned, the overall length of the Faraday rotator which is necessary to rotate laser light of wavelength 1,064 nm by 45 degrees is expanded beyond 30 mm on use of general magnets, which is undesirable because it is difficult to produce a Faraday rotator of such length.

In formula (1), y is a number in the range: $0 \leq y \leq 0.08$, preferably $0 < y < 0.08$, more preferably $0.002 \leq y \leq 0.07$, even more preferably $0.003 \leq y \leq 0.06$. A value of y in the range allows the perovskite heterophase to be reduced below the detectable level by X-ray diffraction (XRD) analysis. A value of y in the range is also preferred in that the number of the perovskite heterophase (in the form of grains having a typical size of 1 to 1.5 µm in diameter and looking as colored light brown) when observed under optical microscope in a visual field of 150 µm×150 µm is 1 or less. At this point of time, the proportion of the perovskite heterophase to the garnet matrix is 1 ppm or less.

When y is 0.08 or more, the substitution of Sc for part of Tb takes place in addition to the substitution of Y for part of Tb, which results in an unnecessary lowering of the solid solution concentration of Tb and hence, a small Verdet constant, which is undesirable. Also, since Sc is obtained from an expensive raw material, the unnecessary excessive doping of Sc is undesirable in view of manufacturing cost. When y is 0.08 or more, undesirably there can be increased the risk that the absorption of antisite defects of Tb and Y entering B sites and Al entering A sites occurs.

In formula (1), z is a number in the range: $0 \leq z < 0.2$, preferably $0 < z < 0.16$, more preferably $0.01 \leq z \leq 0.15$, even more preferably $0.03 \leq z \leq 0.15$. When z is in the range, the perovskite heterophase is not detectable by XRD analysis. A value of z in the range is also preferred in that the number of the perovskite heterophase (in the form of grains having a typical size of 1 to 1.5 µm in diameter and looking as colored light brown) when observed under optical microscope in a visual field of 150 µm×150 µm is 1 or less. At this point of time, the proportion of the perovskite heterophase to the garnet matrix is 1 ppm or less.

When z is equal to or more than 0.2, the effect of suppressing the precipitation of perovskite heterophase is saturated or unchanged, a value of y, that is, the proportion of substitution of Sc for Tb increases in harmony with an increasing value of z, which results in an unnecessary lowering of the solid solution concentration of Tb and hence, a small Verdet constant, which is undesirable. Also, since Sc is obtained from an expensive raw material, the unnecessary excessive doping of Sc is undesirable in view of manufacturing cost. When z is equal to or more than 0.16, undesirably there can be increased the risk that the absorption of antisite defects of Tb and Y entering B sites and Al entering A sites occurs.

In formula (1), y+z is in the range: $0.001 < y+z < 0.20$. When y+z is in the range, the perovskite heterophase is not detectable by XRD analysis. A value of y+z in the range is also preferred in that the number of the perovskite heterophase (in the form of grains having a typical size of 1 to 1.5 µm in diameter and looking as colored light brown) when observed under optical microscope in a visual field of 150 µm×150 µm is 1 or less. At this point of time, the proportion of the perovskite heterophase to the garnet matrix is 1 ppm or less. It is noted that a value of y+z in the range: $0 \leq y+z \leq 0.001$ is undesirable, despite the benefits of the invention being obtained, because there is a likelihood that a heterophase forms due to errors in weighing of raw materials and as a result, the production yield is reduced.

It is preferred for the paramagnetic garnet type transparent ceramic material that the sintered body contains a sintering aid. Specifically, the sintered body contains more than 0% by weight to 0.1% by weight (more than 0 ppm to 1,000 ppm), calculated as $SiO_2$, of the sintering aid. If the content exceeds 0.1% by weight (1,000 ppm), there is a risk that the excess of Si creates crystal defects which cause a minor amount of light absorption.

Also, oxides of magnesium (Mg) or calcium (Ca) may be added as the sintering aid. Mg and Ca are advantageously added because both are divalent ions and these elements are able to compensate for a shift of charge balance within the garnet structure accompanying the addition of tetravalent $SiO_2$. The amount of Mg or Ca added is preferably adjusted in accordance with the amount of $SiO_2$ added.

The paramagnetic garnet type transparent ceramic material of the invention should have an average sintered grain size of from 10 µm to 40 µm, and a ceramic material sample of 20 mm long should have an insertion loss of up to 0.05 dB at wavelength 1,064 nm in an optical effective region in its longitudinal direction.

In the paramagnetic garnet type transparent ceramic material, the average sintered grain size is from 10 µm to 40 µm, preferably from 20 µm to 40 µm. If the average sintered grain size is less than 10 µm, the scattering amount within the ceramic increases, and as a result, the ceramic material sometimes becomes inadequate as the Faraday rotator loaded within the laser machine.

It is noted that the average grain size (average sintered grain size) of sintered grains in the re-sintered body is determined by measuring the diameter of sintered grains in the relevant sintered body under a metallographical microscope. Specifically, the average sintered grain size is determined as follows.

Namely, the re-sintered body is observed under a metallographical microscope using an objective lens with magnification ×50 in the transmission mode, with a transmission open Nicol image being taken on a sintered body sample having end surfaces polished. Specifically, an image is taken on the optical effective region of the relevant sintered body at the predetermined depth. A diagonal line is drawn on the taken image, the total number of sintered grains traversed by the diagonal line is counted, and the length of the diagonal line divided by the total count number is defined as the average sintered grain size of sintered grains in the image. The average grain sizes on taken images read out on analysis operations are summed, and the sum divided by the number of taken images is defined as the average sintered grain size of the relevant sintered body (the same holds true to the method of preparing paramagnetic garnet type transparent ceramic and in Examples below).

Also, a sample of the paramagnetic garnet type transparent ceramic material which is 20 mm long exhibits an insertion loss of up to 0.05 dB, preferably up to 0.04 dB, more preferably up to 0.03 dB, even more preferably up to 0.02 dB at wavelength 1,064 nm in an optical effective region in its longitudinal direction. Then a high beam quality $M^2$ is obtained when the laser beam is transmitted.

As used herein, the optical effective region refers to a region that is optically effective in an optical surface of the paramagnetic garnet type transparent ceramic material, that is, a region that effectively functions as a magneto-optical material when incident light is transmitted and emerged in the bulk of the paramagnetic garnet type transparent ceramic material. Specifically, in the case of paramagnetic garnet type transparent ceramic material of cylindrical shape, for example, the optical effective region refers to an optical surface (circular surface) on an axis of optical utilization minus an end surface peripheral portion which cannot be optically utilized. More specifically, the optical effective region refers a region which is equal to an optical surface minus a peripheral portion corresponding to 19% by area of the optical surface, that is, a region which is disposed inside from the outer periphery of the optical surface and accounts for 81% by area of the optical surface.

As used herein, the insertion loss is a linear transmittance expressed in dB unit. That is, when laser light of wavelength 1,064 nm and power 10 to 20 mW, converged to a beam diameter of 200 to 350 μm is directed to the relevant paramagnetic garnet type transparent ceramic material perpendicular to its optical surface (in the direction of optical utilization axis), the light intensity is measured by a semiconductor sensor. Provided that the light intensity (intensity of incident light) obtained when the ceramic material is not inserted is a reference, a drop of light intensity from the reference is expressed in dB unit.

Also, the paramagnetic garnet type transparent ceramic material preferably has a laser-induced damage threshold of at least 20 J/cm$^2$ at wavelength 1,064 nm and pulse duration 5 ns. Since the paramagnetic garnet type transparent ceramic material is intended for use as the Faraday rotator, it preferably avoids any damage by pulse laser (or has resistance to laser-induced damage). It is preferred that the damage threshold be as high as possible. The damage threshold at a wavelength λ of 1,064 nm and a pulse duration of 5 ns is at least 20 J/cm$^2$, preferably at least 22 J/cm$^2$, more preferably at least 25 J/cm$^2$.

It is noted that the "laser-induced damage threshold at wavelength 1,064 nm and pulse duration 5 ns" is determined by irradiating pulse laser light of wavelength 1,064 nm, pulse duration 5 ns and a predetermined energy density (for example, irradiation beam diameter 100 μm (Gaussian distribution 1/e$^2$ intensity)) to the bulk of the relevant paramagnetic garnet type transparent ceramic material at an arbitrary position, in one shot of irradiation at a fixed position, confirming any damage or intactness on every shot, and gradually increasing the irradiation energy. The minimum of the energy density at which laser-induced damage is observed is regarded as the laser-induced damage threshold (that is, N-on-1 scheme).

The laser-induced damage threshold (LIDT) is dependent on the wavelength, pulse duration and beam spot diameter of irradiating laser light. Therefore, if a laser-induced damage test of wavelength 1,064 nm, pulse duration 5 ns and irradiation beam diameter 100 μm (Gaussian distribution 1/e$^2$ intensity) cannot be carried out, the "laser-induced damage threshold at wavelength 1,064 nm and pulse duration 5 ns" may be derived using the scaling of LIDT. With reference to Non-Patent Document 9: "Wavelength Dependence of Laser-Induced Damage: Determining the Damage Initiation Mechanisms", the following formula (S1) is applicable as the general rule for scaling or converting from the initial conditions: wavelength λ1, pulse duration τ1, and irradiation beam diameter φ1 to new conditions: wavelength λ2, pulse duration τ2, and irradiation beam diameter φ2.

$$LIDT(\lambda 2, \tau 2, \phi 2) = LIDT(\lambda 1, \tau 1, \phi 1) \times (\lambda 1/\lambda 2) \times (\tau 2/\tau 1)^{1/2} \times (\phi 1/\phi 2)^2 \quad \text{(S1)}$$

Therefore, a LIDT at wavelength 1,064 nm, pulse duration 5 ns and irradiation beam diameter 100 μm can be computed from the LIDT value measured under the conditions: wavelength λ1 (nm), pulse duration τ1 (ns), and irradiation beam diameter φ1 (μm) which are different from wavelength 1,064 nm, pulse duration 5 ns and irradiation beam diameter 100 μm (Gaussian distribution 1/e$^2$ intensity), according to the following formula (S2).

$$LIDT(1064, 5, 100) = \qquad\qquad\qquad\qquad (S2)$$
$$LIDT(\lambda 1, \tau 1, \phi 1) \times (\lambda 1/1064) \times (5/\tau 1)^{1/2} \times (\phi 1/100)^2$$

[Method of Preparing Paramagnetic Garnet Type Transparent Ceramic Material]

Another embodiment of the invention is a method of preparing the paramagnetic garnet type transparent ceramic material defined above, comprising the steps of:

pressure-sintering a sintered body of a Tb-containing rare earth aluminum garnet having the formula (1):

$$(Tb_{1-x-y}Y_xSc_y)_3(Al_{1-z}Sc_z)_5O_{12} \qquad\qquad (1)$$

wherein $0 \le x < 0.45$, $0 \le y < 0.08$, $0 \le z < 0.2$, and $0.001 < y+z < 0.20$, heating the pressure-sintered body at a temperature higher than the pressure-sintering temperature for re-sintering to form a re-sintered body having an average sintered grain size of at least 10 μm, and oxidatively annealing the re-sintered body in an oxidative atmosphere at a temperature of at least 1,400° C.

Herein, the paramagnetic garnet type transparent ceramic material is prepared by the following procedure.

(Source Powder for Sintering)

First, a source powder for sintering corresponding to the garnet composite oxide composition having formula (1) is prepared.

Although the method of preparing the source powder for sintering for the garnet type composite oxide is not particularly limited, the source powder for sintering may be obtained by using powdered metal oxides of constitutional elements corresponding to the garnet type composite oxide as starting materials, weighing predetermined amounts thereof so as to reach the composition corresponding to formula (1), and mixing them. The starting raw materials are not particularly limited as long as transparentization is possible. From the aspect of restraining absorption attributable to impurities, their purity is preferably at least 99.9% by weight, more preferably at least 99.99% by weight, most preferably at least 99.999% by weight. Although the primary particle size of the source powder is not particularly limited as long as transparentization is possible, the primary particle size is preferably from 50 nm to 1,000 nm as viewed from ease of sintering. The shape of primary particles is selected from card house, sphere and rod shapes although the shape is not particularly limited as long as transparentization is possible.

Alternatively, the method of preparing the source powder for sintering for the garnet type composite oxide may use any of co-precipitation, crushing, spray thermal decomposition, sol-gel, alkoxide hydrolysis, complex polymerization, uniform precipitation, and other synthesis means. In some cases, the resulting ceramic raw material of rare earth composite oxide may be treated on a wet ball mill, bead mill, jet mill, dry jet mill, hammer mill or the like until the desired particle size is reached. For example, the source powder for sintering may be obtained by the solid phase reaction method of mixing a plurality of particulate oxides and firing the mix to achieve uniformity through thermal diffusion of ions, or the co-precipitation method of dissolving oxide particles to form an ion-containing solution, causing hydroxides, carbonates or the like to precipitate from the solution, firing the precipitate into oxide to achieve uniformity.

In the case of the solid phase reaction method of mixing a plurality of particulate metal oxides and firing the mix to achieve uniformity through thermal diffusion of ions, the starting raw materials which can be preferably utilized include metal powders of terbium, yttrium, scandium and aluminum, or the metal powders which are dissolved in aqueous solution of nitric acid, sulfuric acid or uric acid, or oxide powders of the foregoing elements. The starting materials should preferably have a purity of at least 99.9% by weight, more preferably at least 99.99% by weight. A powder obtained by weighing the predetermined amounts of starting raw materials so as to reach the composition corresponding to formula (1), mixing them, firing the mixture into a fired mixture of metal oxides as desired, and grinding the fired mixture may be used as the source powder for sintering. In this procedure, the firing temperature is preferably equal to or below 1,100° C., more preferably equal to or below 1,050° C., even more preferably equal to or below 1,000° C. If the firing temperature exceeds 1,100° C., the source powder may be densified into a sintered body which cannot be fully ground in the subsequent grinding step. The firing time may be at least 1 hour, during which the heating rate is preferably from 100° C./h to 500° C./h. The firing atmosphere is preferably an oxygen-containing atmosphere such as air or oxygen, whereas nitrogen atmosphere, argon atmosphere and hydrogen atmosphere are inadequate. The firing unit is not particularly limited as long as the desired temperature is reached and oxygen flow is possible, and suitable firing units include a vertical muffle furnace, lateral tubular furnace, rotary kiln and the like.

The source powder for sintering preferably contains a sintering aid. For example, the source powder for sintering may be obtained by adding tetraethoxysilane (TEOS) as the sintering aid to the starting raw materials in an amount of more than 0 ppm to 1,000 ppm (more than 0% by weight to 0.1% by weight), calculated as $SiO_2$, of the overall source powder (garnet type composite oxide powder+sintering aid), or adding $SiO_2$ powder in an amount of more than 0 ppm to 1,000 ppm (more than 0% by weight to 0.1% by weight) of the overall source powder (garnet type composite oxide powder+sintering aid), mixing and firing if necessary. If the addition amount is in excess of 1,000 ppm, there is a risk that the excess of Si creates crystal defects which cause a minor amount of light absorption. The purity is preferably at least 99.9% by weight. The sintering aid may be added during preparation of the source powder slurry. Since Si element can be introduced from the environment (e.g., glassware) used in the preparation steps and part of Si element will volatilize off during sintering under reduced pressure, the content of Si in the final ceramic material may be unintentionally increased or decreased on analysis of the Si content. In this sense, an attention must be paid to the Si content. When the sintering aid is not added, the source powder for sintering (i.e., starting raw material mixed powder or composite oxide powder) consisting of primary particles with a particle size of nanometer order and having a very high sintering activity may be selected. Such selection is optional.

In the embodiment wherein the fired raw material is ground into the source powder for sintering, any of dry and wet grinding techniques may be selected while it is necessary to grind the raw material such that the desired ceramic material may become highly transparent. In the case of wet grinding, for example, the fired raw material is ground and dispersed in slurry form to primary particles by various grinding (dispersing) means such as ball mill, bead mill, homogenizer, jet mill or ultrasonic application. The dispersing medium used for the wet slurry is not particularly limited as long as the final ceramic material can be processed highly transparent, and may be selected from pure water and alcohols, typically lower alcohols of 1 to 4 carbon atoms. Sometimes various organic additives may be added to the wet slurry for the purpose of improving the quality stability and yield in the subsequent ceramic producing process. In the practice of the invention, the foregoing items are not particularly limited. That is, various dispersing agents, binders, lubricants, and plasticizers may be advantageously utilized. Of the organic additives, it is preferred to select an additive of high purity grade free of unnecessary metal ions. In the case of wet grinding, the source powder for sintering is obtained by finally removing the dispersing medium from the slurry.

[Producing Process]

According to the invention, the source powder for sintering is pressed into a predetermined shape, burnout is performed, then pre-sintering is performed to form a pre-sintered body of composite oxide having a relative density of at least 94% and an average sintered grain size of up to 3 μm. Subsequently, the pre-sintered body is pressure-sintered under a pressure of from 50 MPa to 300 MPa and a temperature of from 1,000° C. to 1,780° C. (hot isostatic pressing (HIP) treatment). Preferably, the pressure-sintered body is further heated above the pre-sintering temperature for re-sintering to form a re-sintered body having an average sintered grain size of at least 10 μm.

The average grain size of sintered grains (average sintered grain size) is determined by measuring the diameter of sintered grains in the relevant sintered body under a metallographical microscope. Specifically, the average sintered grain size is determined as follows.

Namely, the pre-sintered body is observed under a metallographical microscope using an objective lens with magnification ×50 in the reflection mode, with a reflection image being taken on the sintered body surface. Specifically, an image is taken on the overall region of the optical effective area of the relevant sintered body in consideration of the effective image size of the objective lens, and analysis is carried out on the image thus taken. At this point of time, a diagonal line is drawn on the taken image, the total number of sintered grains traversed by the diagonal line is counted, and the length of the diagonal line divided by the total count number is defined as the average grain size of sintered grains in the image. The average grain sizes on taken images read out on analysis operations are summed, and the sum divided by the number of taken images is defined as the average sintered grain size of the sintered body (the same holds true, hereinafter).

(Forming)

In the preparation method of the invention, any standard pressing procedures may be advantageously utilized. Namely, most general procedures may be advantageously utilized, for example, uniaxial pressing procedure of charging a mold with the powder and pressing in one direction, cold isostatic pressing (CIP) procedure of placing the powder in a deformable water-proof vessel in a sealed manner and pressing under isostatic pressure, and warm isostatic pressing (WIP) procedure. The applied pressure may be adjusted as appropriate while monitoring the relative density of the formed body. Although the pressure is not particularly limited, it is recommended to manage the pressure in the range of about 300 MPa or lower which can be handled by commercial CIP or WIP system because the production cost can be reduced. Instead of the press forming method, a cast forming method may be used to produce a formed body. Further, another molding method such as pressure cast molding, centrifugal casting or extrusion molding can be employed as long as the combination of the shape and size of the composite oxide powder as the starting raw material with various organic additives is optimized.

Notably, for the purpose of controlling the size and amount of scattering sources such as heterophase, foreign matter, stains and microcracks to the specified range, it is preferred to use a clean special forming jig or forming unit which has been fully cleaned and dried, and to select a clean space having class 1000 or lower as the environment where forming operation is carried out.

(Burnout)

In the preparation method of the invention, any standard burnout step may be advantageously utilized. That is, the method may involve a heating/burnout step in a heating furnace. The type of the atmosphere gas is not particularly limited and any of air, oxygen and hydrogen may be advantageously used. The burnout temperature is not particularly limited. On use of a raw material having an organic additive mixed therein, it is preferred to heat the formed body at a sufficient temperature to decompose off the organic additive.

(Pre-Sintering)

This step is to form a pre-sintered body which is densified to a relative density of at least 94%, and preferably has an average sintered grain size of up to 3 μm, as a sintered body prior to heat sintering. The conditions of this step including temperature and holding time must be adjusted such that the sintered grain size falls in the desired range.

Herein, the ordinary sintering step is advantageously utilized. That is, the heat sintering step of resistance heating, induction heating or another heating mode is advantageously utilized. The atmosphere used herein is not particularly limited and various atmospheres such as ambient air, inert gas, oxygen gas, hydrogen gas and helium gas are applicable. More preferably, sintering under reduced pressure or vacuum is utilized. The pre-sintering is preferably under a vacuum of lower than $1\times10^{-1}$ Pa, more preferably lower than $1\times10^{-2}$ Pa, even more preferably lower than $1\times10^{-3}$ Pa.

In the pre-sintering step, the sintering temperature is preferably 1,450 to 1,650° C., more preferably 1,500 to 1,600° C. A sintering temperature in the range is preferred in that densification is promoted while suppressing heterophase precipitation and grain growth. In the pre-sintering step, the holding time of the order of several hours is sufficient for sintering, but is preferably such that the pre-sintered body is densified to a relative density of at least 94%.

The pre-sintered body should preferably have an average sintered grain size of up to 3 μm, more preferably up to 2.5 μm, even more preferably up to 1 μm. The average grain size of sintered grains can be adjusted by a proper combination of raw material species, atmosphere, sintering temperature and holding time. If the sintered grain size is larger than 3 μm, the subsequent HIP step is unlikely to incur plastic deformation, with the risk of disturbing removal of bubbles remaining in the pre-sintered body.

(Pressure-Sintering (Hot Isostatic Pressing (HIP)))

In the preparation method of the invention, the pre-sintered body after the pre-sintering step is subjected to pressure-sintering (or HIP treatment) preferably under a pressure of from 50 MPa to 300 MPa and at a temperature of from 1,000° C. to 1,780° C. Notably, the species of the pressure gas medium used herein may be selected from inert gases such as argon and nitrogen, and Ar—O₂. The pressure applied by the pressure gas medium is preferably 50 to 300 MPa, more preferably 100 to 300 MPa. A pressure below 50 MPa may fail to achieve a transparency-enhancing effect whereas increasing the pressure beyond 300 MPa fails to achieve further transparency improvement and causes excessive loads to the system, with the risk of damaging the system. An applied pressure of up to 196 MPa is convenient and preferable because a commercial HIP system can be operated to apply such pressure. The treating temperature (holding temperature) is preferably set in the range of 1,000 to 1,780° C., more preferably 1,100 to 1,700° C. A heat treatment temperature above 1,780° C. is undesirable because grain growth takes place during HIP treatment to retard the removal of bubbles. A heat treatment temperature below 1,000° C. may cause a substantial failure to exert the effect of improving the transparency of a sintered body. Although the holding time at the heat treatment temperature is not particularly limited, a too long holding time is undesirable because the risk of generating oxygen deficits increases. The holding time is typically set in the range of 1 to 3 hours. Although the heater material, thermal insulating material and treating vessel for HIP treatment are not particularly limited, graphite, molybdenum, tungsten or platinum (Pt) is advantageously utilized. Also, yttrium oxide and gadolinium oxide may be advantageously utilized for the treating vessel. When the treatment temperature is 1,500° C. or higher, graphite is preferably used as the heater material and thermal insulating material. In this embodiment, the treating vessel is selected from graphite, molybdenum and tungsten, and lined with an inner liner selected from yttrium oxide and gadolinium oxide to construct a double-wall vessel. The vessel is preferably charged with an oxygen release agent because the amount of oxygen deficits generated during the HIP treatment can be minimized.

(Re-Sintering)

The preparation method of the invention involves, after the HIP treatment, the step of heating the pressure-sintered body at a temperature beyond the pressure-sintering temperature, for re-sintering and grain growth to produce a re-sintered body having an average sintered grain size of at least 10 μm. The conditions of this step including temperature and holding time must be elaborately set such that the final sintered grain size may fall in the desired range.

Although the type of atmosphere gas used herein is not particularly limited, air, oxygen or hydrogen is preferably used. Treatment under reduced pressure (vacuum of lower than $1\times10^{-2}$ Pa) is more preferred. The re-sintering temperature is preferably from 1,650° C. to 1,800° C., more preferably from 1,700° C. to 1,800° C. A temperature below 1,650° C. is undesirable because grain growth does not take place. The sintered grains after re-sintering have an average grain size of preferably at least 10 μm, more preferably at least 15 μm, even more preferably at least 20 μm, and preferably up to 40 μm. Although the holding time of the re-sintering step is not particularly limited, the holding time is preferably at least 5 hours, more preferably at least 10 hours, even more preferably at least 20 hours. In general, the longer the holding time is extended, the more grain growth in the sintered body is accelerated. The temperature and holding time of the re-sintering step may be adjusted as appropriate while monitoring the average sintered grain size. It is noted that in general, if the sintering temperature is excessively elevated, abnormal grain growth unexpectedly takes place, with a difficulty to produce a homogeneous sintered body. Then, with some margin allocated to the re-sintering temperature, the average sintered grain size of the re-sintered body is preferably adjusted by prolonging the holding time.

(Oxidative Annealing)

The re-sintered body having undergone the foregoing series of treatments sometimes looks gray to deep blue color as a result of some oxygen deficits being formed by chemical reduction in the HIP treatment step. As the remedy, an oxidative annealing treatment (oxygen deficit-recovering treatment) is performed in an oxidizing atmosphere (oxygen-containing atmosphere), typically air. The annealing treatment temperature is at least 1,400° C., preferably at least 1,450° C., and preferably up to 1,500° C. Although the holding time is not particularly limited, it preferably ranges from a sufficient time to restore oxygen deficits to an appropriate time to avoid the wasteful consumption of electric energy by a long-time treatment. Also, a slightly oxidative HIP treatment may be performed. Even if the re-sintered body has been colored, the treatment functions to restore oxygen deficits, so that the size and amount of scattering source (scattering contrast source) are managed within the specified range. Then a paramagnetic garnet type transparent ceramic material exhibiting least absorption due to oxygen deficits is obtained. Of course, in the case of a ceramic material to which coloring ingredients such as dopants and impurities are added for imparting certain functions, the annealing treatment cannot remove the essential color or absorption of the material.

If the oxidative annealing step is an extremely high temperature/extremely long time treatment, then the size and amount of residual bubbles in the bulk of the sintered body increase. This is undesirable because it is impossible to manage the size and amount of residual bubbles and microcracks in the bulk of the final sintered body within the specified range. In this case, the sintered body is preferably subjected to HIP treatment again and then to annealing treatment in oxygen atmosphere, because it becomes possible to manage the size and amount of residual bubbles and microcracks in the bulk of the sintered body within the specified range.

In the method of preparing a paramagnetic garnet type transparent ceramic material according to the invention, the sintered body after the oxidative annealing treatment is preferably finished to an optical mirror surface at both end surfaces and provided with an antireflective coating at both end surfaces.

(Optical Polishing)

According to the preparation method of the invention, the paramagnetic garnet type transparent ceramic material after the series of steps is preferably of a cylindrical or prism shape. Preferably, both the opposed end surfaces on an axis of optical utilization (optical end surfaces) are finished (to an optical mirror surface) by optical polishing. Herein, the optical surface accuracy as measured at wavelength $\lambda=633$ nm is preferably equal to or less than $\lambda/2$, more preferably equal to or less than $\lambda/8$.

It is possible that an antireflective coating (ARC) is deposited on the optically polished surface to further reduce the optical loss. Herein, chemical treatment is preferably performed prior to the ARC treatment so as not to leave any contaminants on the optical end surfaces, and the optical surfaces are inspected for cleanness under a microscope or stereomicroscope. If the optical surface is rated a low level of cleanness by the cleanness inspection, the surface may be wipe cleaned. In the case of wipe cleaning, a handling tool made of soft material and a wiping tool of low dusting are preferably selected so that the wipe cleaning step may not cause flaws or smear stains to the optical surface.

By subjecting the formed body to (pre-sintering)-(pressure sintering)-(re-sintering) under the predetermined conditions and subsequently, to oxidative annealing treatment and further providing the body with ARC on its optical end surfaces (incident and emergent surfaces), there is obtained a ceramic material having a total light transmittance at wavelength 1,064 nm of at least 99.9% across an optical path length of 20 mm.

(Insertion Loss)

The paramagnetic garnet type transparent ceramic material after the series of steps according to the invention is successful in minimizing the absorption and scattering of transmitting light. As one index of evaluating the absorption and scattering of transmitting light, an insertion loss which is a linear transmittance expressed in dB is advantageously utilized. A low insertion loss is preferred. The insertion loss at wavelength 1,064 nm is preferably up to 0.05 dB, more preferably up to 0.04 dB, even more preferably up to 0.03 dB, and most preferably up to 0.02 dB.

As described above, the invention provides a paramagnetic garnet type transparent ceramic material, which is a sintered body of paramagnetic garnet type composite oxide containing at least terbium and aluminum, having an average sintered grain size of from 10 $\mu$m to 40 $\mu$m and an insertion loss of up to 0.05 dB at wavelength 1,064 nm. Preferably, a transparent sintered body having a laser-induced damage threshold of at least 20 J/cm$^2$ at wavelength 1,064 nm and pulse duration 5 ns is provided.

[Magneto-Optical Device]

Since the paramagnetic garnet type transparent ceramic material is contemplated for use as the magneto-optical material, it is preferably utilized to construct a magneto-optical device by applying a magnetic field to the paramagnetic garnet type transparent ceramic material parallel to its optical axis, and setting a polarizer and an analyzer with their optical axes shifted by 45 degrees. That is, the paramagnetic garnet type transparent ceramic material is best suited in the magneto-optical device application, and especially advantageously used as a Faraday rotator in an optical isolator of wavelength 0.9 to 1.1 $\mu$m.

FIG. 1 is a schematic cross-sectional view of one exemplary optical isolator having a Faraday rotator composed of the inventive magneto-optical material as an optical component.

In FIG. 1, an optical isolator 100 includes a Faraday rotator 110 composed of the paramagnetic garnet type transparent ceramic material, and a polarizer 120 and an analyzer 130 made of polarizing material, which are disposed ahead and aft of the Faraday rotator 110. In optical isolator 100, polarizer 120, Faraday rotator 110 and analyzer 130 are arranged in the described order. Preferably, a magnet 140 is rested on at least one surface of their side surfaces.

The optical isolator 100 may be advantageously utilized in industrial fiber laser machines. That is, the isolator is effective for preventing the reflected light of laser light emitted by a laser light source from returning to the light source to cause unstable oscillation.

EXAMPLES

Examples, Comparative Examples and Reference Examples are given below for further illustrating the invention, but the invention is not limited thereto.

Example 1

Example 1 corresponds to materials of formula (1) wherein y and z are fixed to y=0.004, z=0.03, y+z=0.034 and x varies in the range: 0≤x≤0.396.

There were furnished terbium oxide powder, yttrium oxide powder and scandium oxide powder from Shin-Etsu Chemical Co., Ltd. and aluminum oxide powder from Taimei Chemical Co., Ltd. There were also furnished tetraethyl orthosilicate (TEOS) from Kishida Chemical Co., Ltd. and polyethylene glycol 200 liquid from Kanto Chemical Co. All the powder raw materials had a purity of at least 99.9% by weight and the liquid raw material had a purity of at least 99.999% by weight. By using these raw materials, and adjusting the mixing ratio, the following four oxide raw materials having the final composition shown in Table 1 were prepared.

(Raw Material for Example 1-1 and Comparative Example 1-1)

A powder mixture for $(Tb_{0.598}Y_{0.398}Sc_{0.004})_3$ $(Al_{0.97}Sc_{0.03})_5O_{12}$ was prepared by weighing the raw materials of terbium, yttrium, scandium and aluminum so as to give a molar ratio Tb:Y:Sc:Al=1.794:1.194:0.162:4.850 and mixing. Then TEOS as sintering aid was weighed and added in such an amount as to give 100 ppm of $SiO_2$, obtaining a raw material.

(Raw Material for Example 1-2 and Comparative Example 1-2)

A powder mixture for $(Tb_{0.697}Y_{0.299}Sc_{0.004})_3$ $(Al_{0.97}Sc_{0.03})_5O_{12}$ was prepared by weighing the raw materials of terbium, yttrium, scandium and aluminum so as to give a molar ratio Tb:Y:Sc:Al=2.091:0.897:0.162:4.850 and mixing. Then TEOS as sintering aid was weighed and added in such an amount as to give 100 ppm of $SiO_2$, obtaining a raw material.

(Raw material for Example 1-3 and Comparative Example 1-3)

A powder mixture for $(Tb_{0.797}Y_{0.199}Sc_{0.004})_3$ $(Al_{0.97}Sc_{0.03})_5O_{12}$ was prepared by weighing the raw materials of terbium, yttrium, scandium and aluminum so as to give a molar ratio Tb:Y:Sc:Al=2.391:0.597:0.162:4.850 and mixing. Then TEOS as sintering aid was weighed and added in such an amount as to give 100 ppm of $SiO_2$, obtaining a raw material.

(Raw material for Example 1-4 and Comparative Example 1-4)

A powder mixture for $(Tb_{0.996}Sc_{0.004})_3(Al_{0.97}Sc_{0.03})_5O_{12}$ was prepared by weighing the raw materials of terbium, scandium and aluminum so as to give a molar ratio Tb:Sc:Al=2.988:0.162:4.850 and mixing. Then TEOS as sintering aid was weighed and added in such an amount as to give 100 ppm of $SiO_2$, obtaining a raw material.

Each of the raw materials was placed in a polyethylene pot while paying attention so as to prevent intermixing. Polyethylene glycol 200 as dispersing agent was added to the oxide powder in an amount of 0.5% by weight. Each batch was dispersed and mixed in ethanol on a ball mill. The treating time was 24 hours. The subsequent spray drying yielded a granular raw material having an average particle size of 20 μm.

Subsequently, each of four powder raw materials was subjected to uniaxial press forming and isostatic pressing treatment under a pressure of 198 MPa, obtaining a CIP formed body. The formed body was subjected to burnout treatment in a muffle furnace at 1,000° C. for 2 hours.

In Examples, each burnout formed body was placed in a vacuum heating furnace where pre-sintering treatment was performed at 1,600° C. for 2 hours, obtaining four pre-sintered bodies. The sintered samples had a relative density of at least 94%. The pre-sintered body was placed in a carbon heater-loaded HIP furnace where pressure sintering (HIP) treatment was performed in Ar under conditions: 196 MPa, 1,600° C. and 3 hours. The sintered body after HIP treatment was placed in a vacuum heating furnace again where re-sintering treatment was performed under conditions: reduced pressure of less than $1.0×10^{-3}$ Pa, 1,700° C. and 20 hours. Finally, the re-sintered body was subjected to oxidative annealing treatment in atmospheric air at 1,450° C. for 30 hours. Total four oxidative annealed bodies were obtained. The ceramic bodies after oxidative annealing treatment all looked colorless and transparent.

In Comparative Examples, the burnout formed bodies were placed in a vacuum heating furnace and treated there at 1,600° C. for 2 hours, obtaining four pre-sintered bodies. The sintered samples had a relative density of at least 94%. Each pre-sintered body was placed in a carbon heater-loaded HIP furnace where pressure-sintering (HIP) treatment was performed in Ar under conditions: 196 MPa, 1,600° C. and 3 hours. The pressure-sintered body which was subjected to HIP treatment under anaerobic conditions (oxygen-free atmosphere) according to the teaching of the preceding technical document was not subjected to re-sintering treatment and oxidative annealing treatment.

Each of the thus obtained oxidative annealed bodies (Example) and pressure-sintered bodies (Comparative Example) was machined into a cylinder of diameter 5 mm (for insertion loss measurement) and diameter 10 mm (for laser-induced damage threshold measurement), cut to length 20 mm (for insertion loss measurement) and length 14 mm (for laser-induced damage threshold measurement), and optically polished at both end surfaces to an optical surface accuracy λ/8 wherein measuring wavelength λ=633 nm.

Notably, the sample which was optically polished for insertion loss measurement was provided at both end surfaces with an antireflective coating designed for a center wavelength of 1,064 nm and a reflectivity of up to 0.1%.

The samples thus obtained were analyzed as follows.

(Laser-Induced Damage Threshold)

The laser-induced damage threshold was measured by the N-on-1 test using pulse laser light of wavelength 1,064 nm, pulse duration 5 ns, and irradiation size (beam diameter) 100 μm (Gaussian distribution $1/e^2$ intensity) from an optical system which was adjusted such that a focal position was disposed in the bulk of the material, i.e., 5 mm inside from the laser incident surface of the material. With the irradiation position relative to the optical effective region on the optical end surface of the sample being fixed, while the energy of irradiation was gradually increased from the low irradiation energy density, the energy density which induced damage to the sample was determined. The appearance of damage was judged by letting He—Ne laser enter the material as a probe and visually detecting a luminous point (scattering light) originating from the damage. With the reflectivity R of the incident surface being taken into account, the incident intensity multiplied by a factor of (1-R) was used as the effective damage threshold. In the case of a ceramic material having a refractive index n=1.84, for example, the reflectivity $R=\{(1-1.84)/(1+1.84)\}^2=0.087$, then the incident intensity multiplied by a factor of 0.913 was used. For each sample, measurement was made 3 times, and the average value thereof rounded in significant digits 2 was reported as the damage threshold. The test used the value of damage induced in the bulk of the material. When the emergent end surface was damaged by stains and flaws on the polished surface and surface roughness, these data were excluded.

(Insertion Loss)

The insertion loss was measured by using an optical system constructed using a light source of NKT Photonics AS, a collimetor lens, work stage, power meter of Gentec EO, and Ge photodetector, condensing light of wavelength 1,064 nm to a beam with diameter 200 μm, passing the beam through the sample in its optical effective region, and following formula. The value rounded to significant digits 2 was reported as average sintered grain size D (μm).

$$D = 1.56 \ C/(MN)$$

The results are shown in Table 1 together with the reported values (Non-Patent Document 7) of single crystal TGG as Reference Example 1.

TABLE 1

| | Composition | Re-sintering + oxidative annealing treatment | Laser-induced damage threshold $(J/cm^2)$ | Average sintered grain size D (μm) | Insertion loss (dB) |
|---|---|---|---|---|---|
| Example 1-1 | $(Tb_{0.598}Y_{0.398}Sc_{0.004})_3(Al_{0.97}Sc_{0.03})_5O_{12}$ | treated | 27 | 22 | 0.02 |
| Example 1-2 | $(Tb_{0.697}Y_{0.299}Sc_{0.004})_3(Al_{0.97}Sc_{0.03})_5O_{12}$ | treated | 27 | 26 | 0.02 |
| Example 1-3 | $(Tb_{0.797}Y_{0.199}Sc_{0.004})_3(Al_{0.97}Sc_{0.03})_5O_{12}$ | treated | 25 | 27 | 0.03 |
| Example 1-4 | $(Tb_{0.996}Sc_{0.004})_3(Al_{0.97}Sc_{0.03})_5O_{12}$ | treated | 20 | 30 | 0.05 |
| Comparative Example 1-1 | $(Tb_{0.598}Y_{0.398}Sc_{0.004})_3(Al_{0.97}Sc_{0.03})_5O_{12}$ | nil | 10 | 3.1 | 0.08 |
| Comparative Example 1-2 | $(Tb_{0.697}Y_{0.299}Sc_{0.004})_3(Al_{0.97}Sc_{0.03})_5O_{12}$ | nil | 8.1 | 3.2 | 0.08 |
| Comparative Example 1-3 | $(Tb_{0.797}Y_{0.199}Sc_{0.004})_3(Al_{0.97}Sc_{0.03})_5O_{12}$ | nil | 3.4 | 3.7 | 0.11 |
| Comparative Example 1-4 | $(Tb_{0.996}Sc_{0.004})_3(Al_{0.97}Sc_{0.03})_5O_{12}$ | nil | 2.6 | 4.5 | 0.10 |
| Reference Example 1-1 | $Tb_3Ga_5O_{12}$ | — | 5 | — | — | measuring the intensity of the transmitted light. The insertion loss was computed according to the following formula and expressed in dB. Besides, the work stage on which the sintered body sample was rested was coupled with an automatic stepping motor-mounted mechanism capable of moving the work stage back and forth and up and down. While the sintered body sample was moved from one end to the other end at a pitch of 100 μm, the measurement of insertion loss was repeated whereby an insertion loss distribution over the overall plane of optical effective diameter (region) was measured. Based on the value of a central 2 mm square area in the optical effective region, the average thereof was read out as the insertion loss.

$$\text{Insertion loss (dB/20 mm)} = -10 \times \log_{10}(I/I_0)$$

wherein I is the intensity of transmitted light (intensity of light linearly transmitted by a sample of 20 mm long) and $I_0$ is the intensity of incident light.

(Average Sintered Grain Size D)

The average sintered grain size of crystal grains in a ceramic material was determined with reference to Non-Patent Document 8: "Linear Intercept Technique for Measuring Grain Size in Two-Phase Polycrystalline Ceramics", Journal of the American Ceramics Society, 55, 109 (1972). Specifically, after the mirror-polished transparent ceramic sample used in the measurement of laser-induced damage threshold was treated in air at 1,300° C. for 6 hours, the thermally etched end surface was observed for grain boundary under an optical microscope. Provided that an arbitrary line drawn on the sample end surface has a length C (μm), the number of grains on the line is N, and the magnifying power of the image is M, the value was determined from the It is evident from the above results that the paramagnetic garnet type transparent ceramic materials of Examples 1-1 to 1-4 have an average sintered grain size of at least 22 μm and an insertion loss of up to 0.05 dB. Also, the paramagnetic garnet type transparent ceramic materials all have a laser-induced damage threshold of at least 20 $J/cm^2$, which is at least 4 times greater than that of TGG single crystal (Reference Example 1).

In contrast, the paramagnetic garnet type transparent ceramic materials of Comparative Examples 1-1 to 1-4 have an average sintered grain size of up to 4.5 μm and an insertion loss of at least 0.08 dB. Also, the paramagnetic garnet type transparent ceramic materials all have a laser-induced damage threshold of up to 10 $J/cm^2$.

It is demonstrated that transparent ceramic materials having a high damage threshold are obtained when the average sintered grain size is at least 22 μm and the insertion loss is up to 0.05 dB.

Example 2

Example 2 corresponds to materials of formula (1) wherein x is fixed to x=0.40, while y and z are fixed to y=0.001, z=0.001, and y+z=0.002; y=0.04, z=0.08, and y+z=0.12; and y=0.05, z=0.13, and y+z=0.18. A material of formula (1) wherein y=z=y+z=0 is shown as Reference Example 2-1.

As in Example 1, there were furnished terbium oxide powder, yttrium oxide powder and scandium oxide powder from Shin-Etsu Chemical Co., Ltd. and aluminum oxide powder from Taimei Chemical Co., Ltd. There were also furnished tetraethyl orthosilicate (TEOS) from Kishida Chemical Co., Ltd. and polyethylene glycol 200 liquid from Kanto Chemical Co. All the powder raw materials had a purity of at least 99.9% by weight and the liquid raw material had a purity of at least 99.999% by weight. By using these raw materials, and adjusting the mixing ratio, the following four oxide raw materials of crystal structure having the final composition shown in Table 2 were prepared.

(Raw Material for Example 2-1)

A powder mixture for $(Tb_{0.599}Y_{0.4}Sc_{0.001})_3$ $(Al_{0.999}Sc_{0.001})_5O_{12}$ was prepared by weighing the raw materials of terbium, yttrium, scandium and aluminum so as to give a molar ratio Tb:Y:Sc:Al=1.797:1.200:0.008:4.995 and mixing. Then TEOS as sintering aid was weighed and added in such an amount as to give 100 ppm of $SiO_2$, obtaining a raw material.

(Raw Material for Example 2-2)

A powder mixture for $(Tb_{0.56}Y_{0.4}Sc_{0.04})_3(Al_{0.92}Sc_{0.08})_5O_{12}$ was prepared by weighing the raw materials of terbium, yttrium, scandium and aluminum so as to give a molar ratio Tb:Y:Sc:Al=1.68:1.20:0.52:4.60 and mixing. Then TEOS as sintering aid was weighed and added in such an amount as to give 100 ppm of $SiO_2$, obtaining a raw material.

(Raw Material for Example 2-3)

A powder mixture for $(Tb_{0.55}Y_{0.4}Sc_{0.05})_3(Al_{0.87}Sc_{0.13})_5O_{12}$ was prepared by weighing the raw materials of terbium, yttrium, scandium and aluminum so as to give a molar ratio Tb:Y:Sc:Al=1.65:1.20:0.80:4.35 and mixing. Then TEOS as sintering aid was weighed and added in such an amount as to give 100 ppm of $SiO_2$, obtaining a raw material.

(Raw Material for Reference Example 2-1)

A powder mixture for $(Tb_{0.6}Y_{0.4})_3Al_5O_{12}$ was prepared by weighing the raw materials of terbium, yttrium and aluminum so as to give a molar ratio Tb:Y:Al=1.8:1.2:5.0 and mixing. Then TEOS as sintering aid was weighed and added in such an amount as to give 100 ppm of $SiO_2$, obtaining a raw material.

Each of the raw materials was placed in a polyethylene pot while paying attention so as to prevent intermixing. Polyethylene glycol 200 as dispersing agent was added to the oxide powder in an amount of 0.5% by weight. Each batch was dispersed and mixed in ethanol on a ball mill. The treating time was 24 hours. The subsequent spray drying yielded a granular raw material having an average particle size of 20 μm.

Subsequently, each of four powder raw materials was subjected to uniaxial press forming and isostatic pressing treatment under a pressure of 198 MPa, obtaining a CIP formed body. The formed body was subjected to burnout treatment in a muffle furnace at 1,000° C. for 2 hours.

Each burnout formed body was placed in a vacuum heating furnace where pre-sintering treatment was performed under a reduced pressure of less than $1.0 \times 10^{-3}$ Pa at 1,600° C. for 2 hours, obtaining four pre-sintered bodies. The sintered samples had a relative density of at least 94%. The pre-sintered body was placed in a carbon heater-loaded HIP furnace where pressure sintering (HIP) treatment was performed in Ar under conditions: 196 MPa, 1,600° C. and 3 hours. The pressure-sintered body was placed in a vacuum heating furnace again where re-sintering treatment was performed under conditions: reduced pressure of less than $1.0 \times 10^{-3}$ Pa, 1,700° C. and 20 hours. Finally, the re-sintered body was subjected to oxidative annealing treatment in atmospheric air at 1,450° C. for 30 hours.

Each of the thus obtained oxidative annealed bodies was machined into a cylinder and optically polished at both end surfaces to a mirror surface as in Example 1, obtaining a sample (diameter 5 mm, length 20 mm) for insertion loss measurement and a sample (diameter 10 mm, length 14 mm) for laser-induced damage threshold measurement. Notably, the sample which was optically polished for insertion loss measurement was provided at both end surfaces with an antireflective coating designed for a center wavelength of 1,064 nm and a reflectivity of up to 0.1%.

The samples thus obtained were evaluated for laser-induced damage threshold, average sintered grain size, and insertion loss as in Example 1.

The results are shown in Table 2.

TABLE 2

| | Composition | Re-sintering + oxidative annealing treatment | Laser-induced damage threshold (J/cm²) | Average sintered grain size D (μm) | Insertion loss (dB) |
|---|---|---|---|---|---|
| Example 2-1 | $(Y_{0.4}Tb_{0.599}Sc_{0.001})_3(Al_{0.999}Sc_{0.001})_5O_{12}$ | treated | 25 | 34 | 0.05 |
| Example 2-2 | $(Y_{0.4}Tb_{0.56}Sc_{0.04})_3(Al_{0.92}Sc_{0.08})_5O_{12}$ | treated | 27 | 29 | 0.02 |
| Example 2-3 | $(Y_{0.4}Tb_{0.52}Sc_{0.08})_3(Al_{0.84}Sc_{0.16})_5O_{12}$ | treated | 27 | 27 | 0.02 |
| Reference Example 2-1 | $(Y_{0.4}Tb_{0.6})_3Al_5O_{12}$ | treated | 25 | 35 | 0.05 |

It is evident from the above results that the paramagnetic garnet type transparent ceramic materials of Examples 2-1 to 2-3 have an average sintered grain size of at least 27 μm and an insertion loss of up to 0.05 dB. Their laser-induced damage threshold is at least 25 J/cm².

Example 3

Paramagnetic garnet type transparent ceramic samples were prepared under the same conditions as in Example 2-2 except that the re-sintering time was changed to 2 hours (Comparative Example 3-1), 6 hours (Example 3-1), or 40 hours (Example 3-2).

The evaluation results are shown in Table 3.

TABLE 3

| | Composition | Re-sintering + oxidative annealing treatment | Re-sintering time (hr) | Laser-induced damage threshold $(J/cm^2)$ | Average sintered grain size D $(\mu m)$ | Insertion loss (dB) |
|---|---|---|---|---|---|---|
| Comparative Example 3-1 | $(Y_{0.4}Tb_{0.56}Sc_{0.04})_3(Al_{0.92}Sc_{0.08})_5O_{12}$ | treated | 2 | 12 | 6.9 | 0.07 |
| Example 3-1 | $(Y_{0.4}Tb_{0.56}Sc_{0.04})_3(Al_{0.92}Sc_{0.08})_5O_{12}$ | treated | 6 | 22 | 12 | 0.04 |
| Example 3-2 | $(Y_{0.4}Tb_{0.56}Sc_{0.04})_3(Al_{0.92}Sc_{0.08})_5O_{12}$ | treated | 40 | 27 | 40 | 0.02 |

It is evident from the above results that the paramagnetic garnet type transparent ceramic materials of Examples 3-1 and 3-2 have an average sintered grain size of 12 to 40 µm, an insertion loss of 0.02 to 0.04 dB, and a laser-induced damage threshold of 22 to 27 $J/cm^2$. In contrast, the paramagnetic garnet type transparent ceramic material of Comparative Example 3-1 has an average sintered grain size of 6.9 µm, an insertion loss of 0.07 dB, and a laser-induced damage threshold of 12 $J/cm^2$. Namely, by adjusting the re-sintering conditions (re-sintering time), an average sintered grain size of at least 10 µm and an insertion loss of up to 0.05 dB are achievable. The paramagnetic garnet type transparent ceramic material then has a laser-induced damage threshold of at least 20 $J/cm^2$.

Example 4

Paramagnetic garnet type transparent ceramic samples were prepared under the same conditions as in Example 2-2 except that the oxidative annealing temperature was changed to 1,300° C. (Comparative Example 4-1), 1,400° C. (Example 4-1), or 1,500° C. (Example 4-2).

The evaluation results are shown in Table 4.

transparent ceramic material of Example 1-4 having a laser-induced damage threshold of 20 $J/cm^2$ in Example 5, or the paramagnetic garnet type transparent ceramic material of Comparative Example 1-4 having a laser-induced damage threshold of 2.6 $J/cm^2$ in Comparative Example 5. Using the transparent ceramic material as the Faraday rotator, the optical isolator of the same structure as in Patent Document 6 was prepared.

(Durability Test of Optical Isolator)

A durability test was carried out on the optical isolator by passing pulse laser light of wavelength 1,030 nm, pulse duration 14 ps, average power 150 W, and repeating frequency 600 kHz therethrough. The laser light was substantially parallel light having a beam diameter of 1.0 mm (Gaussian distribution $1/e^2$ intensity). The durability of the optical isolator was evaluated by expanding the transmitted light by an expander and observing the time dependence of intensity of transmitted light by a power meter.

When the optical isolator (Example 5) loaded with the paramagnetic garnet type transparent ceramic material of Example 1-4 having a laser-induced damage threshold of 20 $J/cm^2$ was examined by the durability test over 100 hours,

TABLE 4

| | Composition | Re-sintering + oxidative annealing treatment | Oxidative annealing temperature (° C.) | Laser-induced damage threshold $(J/cm^2)$ | Average sintered grain size D $(\mu m)$ | Insertion loss (dB) |
|---|---|---|---|---|---|---|
| Comparative Example 4-1 | $(Y_{0.4}Tb_{0.56}Sc_{0.04})_3(Al_{0.92}Sc_{0.08})_5O_{12}$ | treated | 1,300 | 7.6 | 30 | 0.08 |
| Example 4-1 | $(Y_{0.4}Tb_{0.56}Sc_{0.04})_3(Al_{0.92}Sc_{0.08})_5O_{12}$ | treated | 1,400 | 26 | 29 | 0.03 |
| Example 4-2 | $(Y_{0.4}Tb_{0.56}Sc_{0.04})_3(Al_{0.92}Sc_{0.08})_5O_{12}$ | treated | 1,500 | 25 | 30 | 0.04 |

It is evident from the above results that the paramagnetic garnet type transparent ceramic materials of Examples 4-1 and 4-2 have an average sintered grain size of 29 to 30 µm, an insertion loss of 0.03 to 0.04 dB, and a laser-induced damage threshold of 25 to 26 $J/cm^2$. In contrast, the paramagnetic garnet type transparent ceramic material of Comparative Example 4-1 has an average sintered grain size of 30 µm, an insertion loss of 0.08 dB, and a laser-induced damage threshold of 7.6 $J/cm^2$. Namely, by adjusting the oxidative annealing treatment conditions, specifically an oxidative annealing temperature of at least 1,400° C., paramagnetic garnet type transparent ceramic materials having an average sintered grain size of at least 10 µm and an insertion loss of up to 0.05 dB are obtained. Their laser-induced damage threshold is at least 20 $J/cm^2$.

Example 5

As one exemplary magneto-optical device, an optical isolator was constructed using the paramagnetic garnet type the intensity of transmitted light showed a change of less than 2% from the initial value.

In contrast, in the durability test of the optical isolator (Comparative Example 5) loaded with the paramagnetic garnet type transparent ceramic material of Comparative Example 1-4 having a laser-induced damage threshold of 2.6 $J/cm^2$, the intensity of transmitted light dropped below 50% of the intensity of incident light substantially simultaneously with the start of the test. Then the test was interrupted.

It is demonstrated that a fully durable optical isolator experiencing no drop of transmittance during continuous operation over 100 hours is obtained as long as the laser-induced damage threshold is at least 20 $J/cm^2$.

Although the invention has been described with reference to the above embodiments, the invention is not limited thereto and can be changed within a scope that a person skilled in the art can conceive, such as other embodiments, additions, modifications and deletions, and any embodiments are included in the scope of the invention as long as the effects of the invention are exerted.

REFERENCE SIGNS LIST

100 Optical isolator
110 Faraday rotator
120 Polarizer
130 Analyzer
140 Magnet

The invention claimed is:

1. A paramagnetic garnet type transparent ceramic material which is a sintered body of Tb-containing rare earth aluminum garnet having the formula (1):

$$(Tb_{1-x-y}Y_xSc_y)_3(Al_{1-z}Sc_z)_5O_{12} \tag{1}$$

wherein $0.199 \leq x < 0.45$, $0 \leq y < 0.08$, $0 \leq z < 0.2$, and $0.001 < y + z < 0.20$, wherein the paramagnetic garnet type transparent ceramic material has an average sintered grain size of from 10 μm to 40 μm, and in the form of a sample of 20 mm long has an insertion loss of up to 0.05 dB at wavelength 1,064 nm in an optical effective region in its longitudinal direction.

2. The paramagnetic garnet type transparent ceramic material of claim 1, having a laser-induced damage threshold of at least 20 J/cm$^2$ at wavelength 1,064 nm and pulse duration 5 ns.

3. A magneto-optical device constructed using the paramagnetic garnet type transparent ceramic material of claim 1.

4. The magneto-optical device of claim 3 which is an optical isolator comprising a Faraday rotator composed of the paramagnetic garnet type transparent ceramic material and polarizers disposed forward and backward of the Faraday rotator on its optical axis, the optical isolator being utilized in a wavelength band of from 0.9 μm to 1.1 μm.

5. A method of preparing the paramagnetic garnet type transparent ceramic material of claim 1, comprising the steps of:

pressure-sintering a sintered body of a Tb-containing rare earth aluminum garnet having the formula (1):

$$(Tb_{1-x-y}Y_xSc_y)_3(Al_{1-z}Sc_z)_5O_{12} \tag{1}$$

wherein $0.199 \leq x < 0.45$, $0 \leq y < 0.08$, $0 \leq z < 0.2$, and $0.001 < y + z < 0.20$, heating the pressure-sintered body at a temperature higher than the pressure-sintering temperature for re-sintering to form a re-sintered body having an average sintered grain size of at least 10 μm, and oxidatively annealing the re-sintered body in an oxidative atmosphere at a temperature of at least 1,400° C.

\* \* \* \* \*